United States Patent Office 2,769,825
Patented Nov. 6, 1956

2,769,825

PREPARATION OF 17α-HYDROXY-20-KETO-PREGNENES FROM Δ¹⁷-PREGNENES

William P. Schneider, Kalamazoo, and John A. Hogg, Kalamazoo Township, Kalamazoo County, Mich., assignors to The Upjohn Company, Kalamazoo, Mich., a corporation of Michigan No Drawing. Application April 26, 1954, Serial No. 425,718

13 Claims. (Cl. 260—397.45)

This invention relates to the production of steroids and more particularly to the production of 17-hydroxy-20-keto-21-acyloxy steroids by the oxygenation of $\Delta^{17(20)}$-21-acyloxy steroids with osmium tetroxide and hydrogen peroxide and is particularly directed to improvements therein in which the oxygenation is effected in the presence of an aromatic tertiary-N-heterocyclic amine.

It is an object of the present invention to provide an improved process for producing a 17-hydroxy-20-keto-21-acyloxy steroid by the oxygenation of a $\Delta^{17(20)}$-21-acyloxy steroid with osmium tetroxide and hydrogen peroxide. Another object is the provision of an improved process for the production of cortisone, hydrocortisone, 11-epihydrocortisone, and 17-hydroxy-11-desoxycorticosterone and their esters. A further object is to provide a process which gives an improved ultimate yield of 17-hydroxy-20-keto-21-acyloxy steroid. A further object is to provide a process which gives an improved yield of 17-hydroxy-20-keto-21-acyloxy steroid per unit time. A further object is to provide a process which gives an improved yield of the desired 17-hydroxy-20-keto-21-acyloxy steroid per unit of osmium tetroxide. Still another object is to provide an improved process for the production of 17α-hydroxy-20-keto-21-acetoxy steroids. Other objects will be apparent to those skilled in the art to which this invention pertains.

These objects are accomplished in the present invention by carrying out the oxygenation of the $\Delta^{17(20)}$-21-acyloxy steroid with osmium tetroxide and hydrogen peroxide in the presence of an aromatic tertiary-N-heterocyclic amine. By carrying out the osmium tetroxide-hydrogen peroxide oxygenation of a $\Delta^{17(20)}$-21-acyloxy steroid in the presence of an aromatic tertiary-N-heterocyclic amine, 17α-hydroxy-20-keto-21-acyloxy steroid is obtained in substantially higher yields than when the oxygenation is carried out in the absence of the amine. These higher yields are manifested in a higher yield per unit of reaction time and in a higher yield per unit of osmium tetroxide and a higher yield of isolatable product. As a consequence, the process of the invention offers advantages in economy of starting material, economy of reagents, economy of time, and additionally gives a product containing less osmium tetroxide or a product from which the residual osmium tetroxide can be more easily removed, and a product of improved color.

The use of osmium tetroxide to convert a double bonded compound into a glycol is a well known reaction. In this reaction, the osmium tetroxide adds to the double bond to form a cyclic osmate ester, which upon hydrolysis, usually with aqueous sodium sulfite, yields a glycol. This reaction has been applied to steroids in U. S. Patents 2,265,143; 2,275,790; 2,492,194; and 2,493,780 where $\Delta^{17(20)}$-21-acyloxypregnane steroids are oxygenated with osmium tetroxide, usually an equimolar amount, followed by hydrolysis with aqueous sodium sulfite, to produce a 17,20,21-trihydroxypregnane steroid. U. S. Patent 2,493,780 also discloses that hydrogen peroxide can be used with a catalytic amount of osmium tetroxide.

Similar hydroxylation (glycolization) reactions involving a double bonded compound, hydrogen peroxide and a catalytic amount of a metal oxide, may be found in U. S. Patents 2,373,942; 2,402,566; 2,414,385 and 2,437,648.

Prins and Reichstein, Helv. Chim. Acta, 25, 300 (1942) report that oxidation of the cyclic osmate ester of a side chain unsaturated steroid with chloric acid gives a hydroxy-keto steroid instead of only glycol steroid produced when the osmate ester is hydrolyzed with aqueous sodium sulfite. Miescher and Schmidlin, Helv. Chim. Acta, 33, 1840 (1950) substituted hydrogen peroxide for the chloric acid as the oxidizing agent of the steroidal osmate ester and in U. S. 2,668,816 disclosed that alkyl peroxides and peracids could be used also. This reaction, however, gives extremely poor yields per unit time, requiring from about 48 to 96 hours or more to reach a maximum yield of about 48 percent. Miescher and Schmidlin have since reported that the reaction is catalyzed by light (U. S. Patent 2,662,854), but even so, the increase in the velocity of the reaction is slight. Their examples, for instance, show the reaction times ranging from twenty hours or more up to eighty hours.

It has now been found in accordance with this invention that the reaction rate is greatly accelerated when the reaction is carried out in the presence of an aromatic tertiary-N-heterocyclic amine. By the process of the invention, for example, it is possible to obtain a ten to 600-fold, or more, increase in the rate of the reaction without sacrifice in the overall yield of the desired 17α-hydroxy-20-keto-21-acyloxy steroid. Furthermore, this marked increase in the reaction rate is normally accompanied by a substantial increase in the overall yield of 17α-hydroxy-20-keto-21-acyloxy steroid. These results, moreover, are accomplished with smaller quantities of osmium tetroxide than are effective in the Miescher-Schmidlin process. Thus it has been found in accordance with this invention that as little as 0.002 mole equivalent of osmium tetroxide, based on the amount of starting steroid, can be used effectively to carry out the desired oxygenation without sacrifice in the overall yield of the desired 17α-hydroxy-20-keto-21-acyloxy steroid. With as little as 0.05 mole equivalent of osmium tetroxide, which is approximately one-half that used by Miescher and Schmidlin, substantially improved overall yields of the desired 17α-hydroxy-20-keto-21-acyloxy steroid is obtained. Moreover, light is not necessary for optimum results, as is necessary in the Miescher and Schmidlin process, thus rendering the process more versatile on an industrial scale.

The aromatic tertiary-N-heterocyclic amines used in the process of the invention are characterized by their amino nitrogen being a member of a >C—N=< group comprised in an aromatic ring as, for example, in the pyridines, e. g., pyridine, picoline, α- and β-lutidine, α-, β- and γ-collidine, propylpyridine, the parvolines, and quinoline, isoquinoline, pyridopyridine, napthyridine, etc. While any of these and like aromatic tertiary-N-heterocyclic amines can be used as accelerators in the process of this invention, it is preferred to use the pyridines, i. e., pyridine and its homologues, e. g., the picolines, β-lutidines, α-lutidines, and collidines, etc., with pyridine being the amine of choice.

The amount of amine employed is not critical and can be varied over a wide range without materially affecting the reaction rate or reaction products, although excessive amounts of amine may sometimes reduce the reaction rate to less than optimum. A molar amount significantly in excess of the amount of steroid employed is preferably used for optimum results.

In carrying out the process of the invention, the starting steroid is advantageously dissolved in an inert organic solvent, for example, tertiary butyl alcohol, diethyl ether, tetrahydrofuran, and the like, and the osmium tetroxide, the aromatic tertiary-N-heterocyclic amine, and the hydrogen peroxide mixed therein. Advantageously, though not necessarily, the osmium tetroxide and the aromatic tertiary-N-heterocyclic amine are added prior to the addition of the hydrogen peroxide. Advantageously also, the osmium tetroxide and the hydrogen peroxide are added as a solution in the same solvent used as the vehicle for the reaction. The aromatic tertiary-N-heterocyclic amine can be added as such or in like solution.

The amount of osmium tetroxide can vary widely, say from 0.2 mole equivalent to 0.002 mole equivalent. Advantageously, however, not more than 0.05 mole equivalent is used. When the amount of osmium tetroxide is kept between 0.002 and 0.05 mole equivalents, it is possible to obtain high yields of desired product and to effectively remove the residual osmium tetroxide by treating a solution of the reaction product contaminated with residual osmium tetroxide with an osmium tetroxide precipitant, such as sodium sulfite, without the use of heat or long contact periods. In this way a high yield of product of improved color and composition is obtained without substantial deacylation of the 21-acyloxy group.

The amount of hydrogen peroxide theoretically required to produce a 17α-hydroxy-20-keto-21-acyloxy steroid is two moles for each mole of osmate ester formed in the reaction. It has been found, however, that in the process of the invention more than the theoretical amount of hydrogen peroxide is necessary to obtain a complete reaction. For optimum results in the process of the invention, therefore, it is necessary to use hydrogen peroxide in excess of the theoretical amount. Thus in the process of the invention, optimum results are ordinarily obtained using between about 2.2 and about 2.75 equivalents of hydrogen peroxide. When less hydrogen peroxide is used, the yield is impaired through incomplete reaction. Higher amounts of hydrogen peroxide than about 2.75 molar equivalents may be used, in many cases without impairing the yield, but higher amounts are undesirable especially where a 3-keto-$\Delta^{4,17(20)}$-21-acyloxy steroid is to be oxygenated. It has been observed with such steroids that excessive concentrations of hydrogen peroxide tend to degrade the A-ring, thus causing a secondary reaction which impairs the overall yield of the desired $\Delta^4$-3,20-diketo-17α-hydroxy-21-acyloxy steroid.

If desired, the hydrogen peroxide can be added slowly to the steroid-osmium tetroxide-amine mixture, e. g., over a period of several minutes to several hours. Sometimes the reaction proceeds more favorably under these conditions, especially when the starting steroid contains a $\Delta^4$-3-keto group which is desired to be maintained intact. However, the hydrogen peroxide normally can be added substantially instantaneously because of the high reaction velocity. In such case, it may be desirable, since the reaction is somewhat exothermic, to cool the reaction mixture. Advantageously, the rate of hydrogen peroxide addition is so adjusted that the reaction is substantially complete by the time the last hydrogen peroxide is added. This can easily be determined by titrating for residual hydrogen peroxide.

The reaction advantageously is performed with an organic solvent solution of hydrogen peroxide, e. g., in dry tertiary butyl alcohol, or like solvent, and under initially fairly dry conditions. Since water is produced in the reaction, the reaction normally is not maintained anhydrous, although the addition of an efficient inert drying agent or other suitable means of removing the water of reaction can sometimes be employed with advantage. Initially anhydrous conditions usually result in enhanced yield of the desired 17-hydroxy-20-keto steroid, with a corresponding reduction in yield of the undesired 17,20-dihydroxy steroid.

A reaction temperature between about fifteen and about thirty degrees centigrade is the preferred reaction temperature although somewhat higher and somewhat lower temperatures are operable, e. g., between about minus ten and about plus seventy degrees centigrade. Room temperature is ordinarily employed not only for convenience but also for the fact that usually optimum yields of the desired 17-hydroxy-20-keto steroid are obtained at that temperature.

In place of the solvents noted above, there may be used any inert solvent which is a solvent for the reagents. The term "inert solvent" is used here in accordance with the second definition of "solvent" in Hackh's Chemical Dictionary, third edition, to mean "A liquid which dissolves another substance without any change in chemical composition," in contradistinction to those types of solvents which dissolve by a chemical reaction. Suitable other solvents include cyclohexanone, dioxane, tertiary amyl alcohol, ethanol, and methanol. Advantageously, the solvent is a solvent boiling low enough so that it can be removed from the reaction mixture by distillation under reduced pressure without heating the reaction mixture.

Whereas the reaction of a $\Delta^{17(20)}$-21-acyloxy steroid with osmium tetroxide and hydrogen peroxide is a sluggish reaction which requires at least twenty hours or more to reach completion, the reaction of a $\Delta^{17(20)}$-21-acyloxy steroid with osmium tetroxide and hydrogen peroxide in the presence of an aromatic tertiary-N-heterocyclic amine is normally substantially complete in less than one hour and sometimes in less than five minutes. Sometimes a longer time is needed, but even so, the overall time rarely, if ever, will exceed eight hours. Thus the yield per unit time, at its lowest, is in the order of 0.15 percent per minute and sometimes as high as ten percent per minute. Considering that the prior art processes at optimum give a yield per unit time not substantially greater than 0.015 percent per minute, it will be seen that the reaction in the presence of an aromatic tertiary-N-heterocyclic amine proceeds at a greatly accelerated rate. Thus the desired 17-hydroxy-20-keto steroid is produced in the process of the invention at a rate some ten to 600 times or so greater than in the prior art processes.

The use of an aromatic tertiary-N-heterocyclic amine in the reaction not only markedly decreases the reaction time necessary to achieve complete reaction, but also results in a substantial increase in the yield of 17-hydroxy-20-keto steroid. For example, the reaction of 11β-hydroxy-21-acetoxy-4,17(20)-pregnadiene-3-one with hydrogen peroxide and osmium tetroxide required more than 48 hours to reach completion and then gave a yield of only 47 percent hydrocortisone acetate, whereas when following the process of the invention yields of 53 to sixty percent were obtained in two to six hours of reaction time, respectively (see Examples 1 and 2). The marked increase in the rate of the reaction makes the process of the invention more commercially desirable and economical than the prior art process. The surprising and significant increase in yield of the valuable hydrocortisone acetate is similarly of economic importance. The process of the invention can also be utilized to obtain corresponding increases in yield and a reduction in total reaction time over the prior art process with other $\Delta^{17(20)}$-21-acyloxy steroids.

The aromatic tertiary-N-heterocyclic amines which are used in the process of the invention are all characterized by being substantially unaffected by the hydrogen peroxide under the conditions of the reaction. Primary, secondary and most non-aromatic tertiary amines are readily oxidized by hydrogen peroxide and react with the hydrogen peroxide, thus affecting the course of the reaction. Moreover, the presence of a primary, secondary or tertiary amine, other than aromatic tertiary-N-heterocyclic amines, appears to disadvantageously affect the reaction rate. The aromatic tertiary-N-heterocyclic amines, however, are substantially unaffected by hydrogen peroxide under the conditions of the reaction and act in a surprising and advantageous manner to accelerate the reaction and to increase the yields. This acceleration of the reaction also makes it possible practically to carry out the reduction using catalytic amounts of osmium tetroxide with the result that (1) the osmium content of the product is markedly reduced, (2) greater economy is effected, and (3) the reaction is safer to run.

The $\Delta^{17(20)}$-21-acyloxy steroids, preferably of the pregnene series, which can be oxygenated to produce the corresponding 17α-hydroxy-20-keto-21-acetoxy steroids by the process of the invention may be represented by the following formula:

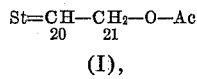

$$\underset{20}{St}=CH-\underset{21}{CH_2}-O-Ac$$

(I), wherein Ac represents the acyl radical of an organic carboxylic acid, preferably containing from one to eight carbon atoms, inclusive, especially the acyl radical of a lower-aliphatic carboxylic acid, particularly acetic acid, and wherein St represents a steroidal cyclopentanopolyhydrophenanthrene radical attached to the above-identified side chain by a double bond at carbon atom 17. Advantageously, the cyclopentanopolyhydrophenanthrene radical and the acyl radical are both free of substituents or groupings which are affected by osmium tetroxide under the conditions of the process. A preferred type of starting steroid is either saturated or contains only $\Delta^4$ unsaturation coupled with a 3-keto group. Similarly, it is of advantage if the preferred starting steroids contain only saturated acyl groups because double bonds, whether in the nucleus or in the acyl radical, sometimes are also affected by the osmium tetroxide and hydrogen peroxide. In addition the nucleus of the starting steroid can advantageously have a hydroxy, keto, acyloxy, hydrocarbonoxy, benzyloxy, halogen, or oxido group or groups at the 3, 6, 11 and 12 or other positions of the nucleus. The process of the invention, however, being an improvement in prior processes for oxygenating $\Delta^{17(20)}$-21-acyloxy steroids to 17-hydroxy-20-keto-21-acyloxy steroids is, in its broader aspects, broadly applicable to oxygenation of any $\Delta^{17(20)}$-21-acyloxy steroid to 17-hydroxy-20-keto steroids. In its more particular aspects, however, the process of the invention is particularly adapted to the oxidation of 3-oxygenated-$\Delta^{17(20)}$-21-acyloxy pregnane series steroids, e. g., 3α- and 3β-hydroxy-21-acetoxy-17(20)-pregnene, 3α,21- and 3β,21-diacetoxy-17(20)-pregnene, 3α,11β- and 3β,11β-dihydroxy-21-acetoxy-17(20)-pregnene, 3α,11β- and 3β,11β-dihydroxy-21-acetoxy-17(20)-allopregnene, 21-acetoxy-17(20)-pregnene-3-one, 21-acetoxy-17(20)-pregnene-3,11-dione, 11β-hydroxy-21-acetoxy-4,17(20)-pregnadiene-3-one, 11α-hydroxy-21-acetoxy - 4,17(20) - pregnadiene - 3 - one, 21 - acetoxy- 4,17(20) - pregnadiene - 3,11 - dione, 21 - acetoxy- 4,9(11),17(20)-pregnatriene-3-one, and other 21-acyloxy esters of the above-named compounds and the like wherein the 21-acyloxy group is, for example, formyloxy, acetoxy, propionyloxy, butyryloxy, dimethylacetoxy, trimethylacetoxy, isobutyryloxy, valeryloxy, hexanoyloxy, β-cyclopentylpropionyloxy, dimethylacetoxy, benzoxy, phenylacetoxy, succinoyloxy, phthaloyloxy, or the like. Of these starting steroids, especially preferred are steroids represented by the following formula:

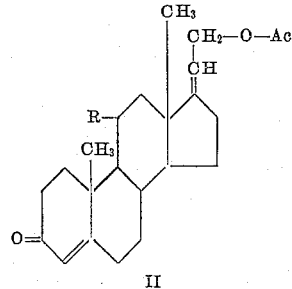

II wherein Ac is the acyl radical of an organic carboxylic acid, preferably a lower-aliphatic acid, especially acetic acid, and wherein R is a hydrogen atom, an α-acyloxy group, preferably lower-acyloxy, e. g., acetoxy, a β-hydroxy group or ketonic oxygen (=O), since these steroids can be readily converted, utilizing the process of the present invention into the physiologically active cortical hormones cortisone (Kendall's Compound E) and hydrocortisone (Kendall's Compound F). For example, reacting 21-acetoxy-4,17(20)-pregnadiene-3,11-dione with osmium tetroxide and hydrogen peroxide in the presence of pyridine according to the method of the present invention produces cortisone acetate. Similarly, 11β-hydroxy - 21 - acetoxy - 4,17(20) - pregnadiene - 3 - one is converted in the same manner to 11β,17α-dihydroxy-21 - acetoxy - 4 - pregnene - 3,20 - dione (hydrocortisone acetate). 11α - Hydroxy - 21 - acetoxy - 4,17(20)-pregnadiene-3-one is similarly converted, to 11α,17α-dihydroxy-21-acetoxy-4-pregnene-3,20-dione, which is readily oxidized with chromic acid to cortisone acetate (U. S. Patent 2,602,769 of Murray and Peterson, issued July 8, 1952). Since most physiologically active steroids possess a 17α-hydroxy-20-keto-21-hydroxy or acyloxy grouping, the process of the present invention provides an effective method of converting $\Delta^{17(20)}$-21-acyloxy steroids into steroids possessing at least part of the requisite structure necessary to produce a physiologically active steroid. Since many synthetic methods are known in the art for the introduction of a $\Delta^4$-3-keto group and the introduction of an 11-oxygen atom into the steroid nucleus and for the removal of inactivating groups from the nucleus, other steroids besides those represented by formula II are readily convertible, via the process of the present invention, into physiologically active cortical hormones.

The starting $\Delta^{17(20)}$-21-acyloxy steroids for the process of the invention can be produced in several ways. For example, the Dimroth reaction [Dimroth, Berichte, 71B, 1334 (1938)], applied to 17β-hydroxy-20-pregnene steroids, produces 21-hydroxy, 21-acetoxy, or 21-bromo-17(20)-pregnene steroids which can be converted to other 21-acyloxy steroids according to methods known in the art [see Serini, British 213,630, Berichte, 71B, 1313, 1362 (1938), U. S. 2,267,258, 2,305,727, British 467,790, Miescher et al., Helv. Chim. Acta, 22, 120, 894 (1939), Ruzicka and Mueller, ibid., 22, 416,755 (1939)]. Alternatively, these starting compounds can be produced by the method disclosed hereinafter and in copending application Serial No. 307,385.

Since it is ordinarily advantageous to separate the osmium from the steroidal reaction product, the reaction mixture is usually treated with an agent capable of removing the osmium e. g., sodium sulfite, hydrogen sulfide, or the like, to precipitate the osmium as free osmium or as an insoluble salt of the added anion. The common procedure heretofore has been to heat the reaction mixture with aqueous sodium sulfite at elevated temperatures, e. g., the refluxing temperature of the mixture. Under these conditions, an acetate group in the reaction product is at least partially hydrolyzed and reacetylation is necessary to produce a completely acetylated reaction product.

When following the preferred conditions of the present invention, the reaction product is mixed with aqueous sodium sulfite at about room temperature or lower to remove the osmium from the reaction mixture. Under these conditions, an acetate or other readily hydrolyzable ester group in the molecule is maintained intact and the reesterification step necessary when following the procedure of the prior art is not needed. Enhanced yield of steroidal product is thereby obtained.

The use of low concentrations of osmium tetroxide in the reaction mixture, e. g., less than about 0.05 and preferably as low as 0.002 molar equivalent, calculated on the starting steroid, results in an insignificant loss in reaction product which may be tied up as an osmate ester at the end of the reaction, if the reaction mixture is not hydrolyzed. If traces of osmium are not undesirable in the reaction mixture, the hydrolysis step may therefore be eliminated when employing the preferred low concentrations of osmium tetroxide in the reaction mixture, further enhancing the simplicity of the reaction. The extremely slow reaction obtained when performing the reaction of the prior art ordinarily prohibits the use of these low concentrations of osmium tetroxide. Since the supply of osmium tetroxide is somewhat limited and osmium tetroxide is toxic and dangerous, the use of these very low concentrations facilitates the adaptation of the process to large scale reactions.

The following examples are illustrative of the process and products of the present invention but are not to be construed as limiting.

PREPARATION 1.—3,11-DIKETO-4,17(20)-PREGNADIENE-21-OIC ACID METHYL ESTER

To a mixture of 6.4 milliliters of methanolic sodium methoxide, 0.90 milliliter of absolute ethanol, and forty milliliters of dry benzene, which had previously been distilled until sixteen milliliters of distillate had been collected and the mixture then cooled, was added 4.6 milliliters of ethyl oxalate and a solution of 6.56 grams of 11-ketoprogesterone in 76 milliliters of dry benzene. The solution became turbid and a yellow precipitate formed. The reaction mixture was stirred for ninety minutes and 110 milliliters of ether was then added thereto and stirring was continued for sixty minutes followed by the addition of a 260-milliliter portion of ether. The thus-formed yellow precipitate of the sodium enolate of 21-ethoxyoxalyl-11-ketoprogesterone was filtered, washed with several fifty-milliliter portions of ether and after drying weighed 7.30 grams. The ether washings contained 1.08 grams of unreacted 11-ketoprogesterone. The yield of the sodium enolate of 21-ethoxyoxalyl-11-ketoprogesterone was 81 percent of the theoretical or practically quantitative calculated on the reacted 11-ketoprogesterone. The presence of a sodium enolate was verified by the extreme solubility of the product in water and by a positive ferric chloride test for enols as exhibited by the formation of a bright red color when the product was dissolved in alcoholic and aqueous ferric chloride solutions.

The sodium enolate of 11α-hydroxy-21-ethoxyoxalyl-progesterone, the sodium enolate of 11β-hydroxy-21-ethoxyoxalylprogesterone, the sodium enolate of 11α-acetoxy-21-ethoxyoxalylprogesterone, and the sodium enolate of 21-ethoxyoxalylprogesterone, respectively, are prepared by substituting 11α-hydroxyprogesterone, 11β-hydroxyprogesterone, 11α-acetoxyprogesterone, and progesterone, respectively, for the 11-ketoprogesterone as starting steroid in the above-described reaction.

To a stirred solution of 4.50 grams (0.01 mole) of the sodium enolate of 11-keto-21-ethoxyoxalylprogesterone and two grams of potassium acetate in 150 milliliters of methanol was added dropwise 3.09 grams (1.00 milliliters; 0.0193 mole) of bromine. When the addition was complete, 3.24 grams (0.06 mole) of sodium methoxide in forty milliliters of methanol was added thereto, whereafter the whole was maintained at about 25 degrees centigrade for sixteen hours. The reaction mixture was then mixed with a large volume of water and the whole was extracted successively with one portion of benzene and two portions of methylene chloride. The combined extracts were dried over anhydrous sodium sulfate and the solvent was then removed therefrom by distillation. The residue was dissolved in 100 milliliters of methylene chloride and chromatographed over and eluted from 150 grams of Florisil synthetic magnesium silicate with methylene chloride containing increasing amounts of acetone. The methylene chloride plus five percent acetone eluates contained 1.2 grams of 3,11-diketo-4,17(20)-pregnadiene-21-oic acid methyl ester, melting at 155 to 188 degrees centigrade. Crystallization of these crystals from a mixture of acetone plus Skellysolve B hexane hydrocarbons gave crystals melting at 207 to 212 degrees centigrade.

Similarly, on substituting the sodium enolate, of 11α-hydroxy-21-ethoxyoxalylprogesterone for the sodium enolate of 11-keto-21-ethoxyoxalylprogesterone used in the reaction described above, there is obtained methyl 3-keto-11α-hydroxy-4,17(20)-pregnadiene-21-oate. The sodium enolate of 21-ethoxyoxalylprogesterone is similarly converted to methyl 3-keto-4,17(20)-pregnadiene-21-oate.

PREPARATION 2.—3-ETHYLENE GLYCOL KETAL OF 3,11-DIKETO - 4,17(20) - PREGNADIENE-21-OIC ACID METHYL ESTER

To a solution of 1.5 grams (0.0042 mole) of 3,11-diketo-4,17(20)-pregnadiene-21-oic acid methyl ester dissolved in 150 milliliters of benzene was added 7.5 milliliters of ethylene glycol and 0.150 gram of para-toluenesulfonic acid and the whole was then heated with stirring at the reflux temperature of the reaction mixture for 5.5 hours. The cooled reaction mixture was washed with 100 milliliters of a one percent aqueous sodium bicarbonate solution. The benzene layer was then poured on a column of 150 grams of Florisil synthetic magnesium silicate. The column was developed with 100-milliliter portions of solvents of the following composition and order: eight portions of methylene chloride and three portions of methylene chloride plus four percent acetone. The methylene chloride eluates contained 1.08 grams of the 3-ethylene glycol ketal of 3,11-diketo-4,17(20)-pregnadiene-21-oic acid methyl ester, which upon recrystallization from a mixture of ethyl acetate and Skellysolve B hexane hydrocarbons melted at 188 to 190 degrees centigrade and had the analysis given below. The methylene chloride plus four percent acetone eluates contained 0.390 gram of pure starting 3,11-diketo-4,17(20)-pregnadiene-21-oic acid methyl ester. The yield of product was 87 percent of the theoretical calculated on the amount of starting steroid which reacted.

Analysis.—Calculated for $C_{24}H_{32}O_5$: C, 71.94; H, 8.05. Found: C, 71.90; H, 7.95.

Substituting methyl 3-keto-11α-hydroxy-4,17(20)-pregnadiene-21-oate for the methyl 3,11-diketo-4,17(20)-pregnadiene-21-oate as starting steroid in the reaction described above gives the 3-ethylene glycol ketal of methyl 3-keto-11α-hydroxy-4,17(20)-pregnadiene-21-oate. Methyl 3-keto-4,17(20)-pregnadiene-21-oate is similarly converted to the 3-ethylene glycol ketal of methyl 3-keto-4,17(20)-pregnadiene-21-oate.

PREPARATION 3.—3-ETHYLENE GLYCOL KETAL OF 11β,-21-DIHYDROXY-4,17(20)-PREGNADIENE-3-ONE

A solution of 1.50 grams of the 3-ethylene glycol ketal of 3,11-diketo-4,17(20)-pregnadiene-21-oic acid methyl ester in seventy milliliters of benzene was added dropwise to a stirred mixture of 1.50 grams of lithium aluminum hydride and fifty milliliters of anhydrous ether. When addition was complete, the reaction mixture was refluxed for one-half hour whereafter the mixture was cooled to room temperature. Fifty milliliters of water was then cautiously added to the stirred reaction mixture to decompose the excess lithium aluminum hydride, followed by 200 milliliters of methylene chloride. The whole was then centrifuged to facilitate separation of the organic and aqueous phases. The organic phase was separated, the solvent distilled and the white crystalline distillation residue was crystallized from a mixture of ethyl acetate and Skellysolve B hexane hydrocarbons to yield 1.003 grams, a yield of 72 percent of the theoretical, of crystalline 3-ethylene glycol ketal of 11β,21-dihydroxy-4,17(20)-pregnadiene-3-one in two crops. The first crop, the analysis of which is given below, melted at 191 to 194 degrees centigrade and the second, at 172 to 180 degrees centigrade.

Analysis.—Calculated for $C_{23}H_{34}O_4$: C, 73.76; H, 9.15. Found: C, 73.87; H, 9.22.

Substituting the 3-ethylene glycol ketal of methyl 3-keto-11α-hydroxy-4,17(20)-pregnadiene-21-oate as the starting steroid in the above-described reaction gives the 3-ethylene glycol ketal of 11α,21-dihydroxy-4,17(20)-pregnadiene-3-one. The 3-ethylene glycol ketal of methyl 3-keto-4,17(20) - pregnadiene-21-oate is similarly converted to the 3-ethylene glycol ketal of 11α,21- dihydroxy-4,17(20)-pregnadiene-3-one.

PREPARATION 4.—11β,21 - DIHYDROXY - 4,17(20) - PREGNADIENE-3-ONE

A solution of 0.572 gram (0.0015 mole) of the 3-ethylene glycol ketal of 11β,21-dihydroxy-4,17(20)-pregnadiene-3-one in forty milliliters of acetone was diluted with water to a volume of fifty milliliters and eight drops of concentrated sulfuric acid was then added thereto, whereafter the reaction mixture was kept at room temperature for 24 hours. The reaction mixture was then made alkaline by the addition of a saturated aqueous sodium bicarbonate solution and the acetone was then evaporated from the mixture. Methylene chloride and more water were then added, the methylene chloride layer removed, and the solvent distilled therefrom. The residue, after drying in vacuo, consisted of the theoretical 0.518 gram of 11β,21-dihydroxy-4,17(20)-pregnadiene-3-one.

Substituting the 3-ethylene glycol ketal of 11α,21-dihydroxy-4,17(20)-pregnadiene-3-one as the starting steroid in the above-described reaction gives 11α,21-dihydroxy-4,17(20) - pregnadiene-3-one. The 3 - ethylene glycol ketal of 21-hydroxy-4,17(20)-pregnadiene-3-one is similarly hydrolyzed to 21-hydroxy-4,17(20)-pregnadiene-3-one.

PREPARATION 5.—11β-HYDROXY-21-ACETOXY-4,17(20)-PREGNADIENE-3-ONE

A solution of 0.518 gram of 11β,21-dihydroxy-4,17(20)-pregnadiene-3-one in five milliliters of pyridine was mixed with two milliliters of acetic anhydride and the whole was then maintained at room temperature for seventeen hours whereafter crushed ice was added thereto. The precipitated 11β-hydroxy-21-acetoxy-4,17(20)- pregnadiene-3-one was filtered therefrom, dissolved in benzene and then chromatographed over a column of 75 grams of Florisil synthetic magnesium silicate. The column was developed with 75-milliliter portions of solvents of the following composition and order: benzene, three portions each of Skellysolve B hexane hydrocarbons plus one percent acetone, Skellysolve B plus five percent acetone, Skellysolve B plus ten percent acetone, Skellysolve B plus fifteen percent acetone, Skellysolve B plus twenty percent acetone, and finally, two portions of acetone. The eluate fractions containing ten percent and fifteen percent acetone, respectively, were combined, the solvent removed therefrom, and the crystalline residue was crystallized from a mixture of ethyl acetate and Skellysolve B to yield as the first crop 0.253 gram, a yield of 45 percent of the theoretical, of 11β-hydroxy-21-acetoxy-4,17(20)-pregnadiene-3-one melting at 183 to 186 degrees centigrade.

*Analysis.*—Calculated for $C_{23}H_{32}O_4$: C, 74.16; H, 8.66. Found: C, 74.18; H, 8.45; C, 73.95; H, 8.74.

Similarly, esterifying 21 - hydroxy - 4,17(20) - pregnadiene-3-one in the manner described above with acetic anhydride gives 21-acetoxy-4,17(20)-pregnadiene-3-one. 11α-hydroxy-21-acetoxy-4,17(20) - pregnadiene - 3 - one and 11α,21-diacetoxy-4,17(20) - pregnadiene - 3 - one, respectively are similarly prepared by employing about a molar equivalent and a large molar excess of acetic anhydride, respectively, in the manner described above.

Other esters of 11α,21-dihydroxy-4,17(20)-pregnadiene - 3 - one, 11β,21-dihydroxy-4,17(20)-pregnadiene-3-one and 21-hydroxy-4,17(20)-pregnadiene-3-one are prepared by substituting other acid anhydrides or acid chlorides in the reaction described above, e. g., propionic anhydride, benzoyl chloride, phthalic anhydride, succinic anhydride, oxalyl chloride, trimethylacetyl chloride, cyclopentanopropionyl chloride, diethylacetyl chloride, phenylpropionyl chloride, and the like. The formate esters are ordinarily prepared using about 98 percent formic acid and an esterification catalyst.

Oxidation of 11-hydroxy-21-acyloxy-4,17(20)-pregnadiene-3-one with chromic acid is productive of the corresponding 21-acyloxy-4,17(20)-pregnadiene-3,11-dione.

*Example 1.—Oxygenation of 11β-hydroxy-21-acetoxy-4,17(20)-pregnadiene-3-one with amine catalyst*

To a solution of 744 milligrams (2.0 millimoles) of 11β-hydroxy-21-acetoxy-4,17(20)-pregnadiene - 3 - one in thirty milliliters of tertiary butyl alcohol were added one milliliter of pyridine and 25 milligrams (0.1 millimole) of osmium tetroxide in eight milliliters of tertiary butyl alcohol. To the resulting solution was added 8.36 milliliters of (5.0 millimoles) of an 0.6 molar solution of hydrogen peroxide in tertiary butyl alcohol over a period of one hour and the mixture stirred for another hour. The tertiary butyl alcohol used was sodium dried and had a moisture content of about 0.04 percent.

The reaction mixture thus obtained was immediately worked up as follows: 600 milligrams of sodium sulfite dissolved in 25 milliliters of water was added and, after stirring for five minutes, the resulting mixture was concentrated to about fifteen milliliters by distillation at a pressure of about fifty millimeters mercury absolute and the resulting concentrate then extracted with methylene chloride. The methylene chloride extract was dried and chromatographed over eighty grams of synthetic magnesium silicate (Florisil). The column was developed with ethylene chloride containing increasing amounts of acetone. The starting steroid came over in the 2.5 percent acetone fraction, totaling in aggregate 1600 milliliters and containing 140 milligrams (twenty percent) of starting steroid. The desired product, hydrocortisone acetate, came off the column in the fractions containing seven percent acetone, totaling in aggregate 2000 milliliters of ethylene chloride solution and containing 428 milligrams (53 percent) of hydrocortisone acetate. The yield, calculated on starting steroid which reacted, was 67 percent of the theoretical. The glycol by-product, 11β,17α,20-trihydroxy-21 - acetoxy-4-pregnene - 3 - one, came off the column in the fifteen percent acetone fractions, totaling in aggregate 800 milliliters and containing 101 milligrams (12.5 percent) of the by-product.

*Example 2*

For comparative purposes, the process of Hiescher and Schmidlin was applied to the oxygenation of 11β-hydroxy-21-acetoxy-4,17(20)-pregnadiene-3-one to produce hydrocortisone acetate using essentially the same proportion as given in Example 1.

To a solution of 744 milligrams (2.0 millimoles) of 11β-hydroxy-21-acetoxy-4,17(20)-pregnadiene-3-one in thirty milliliters of tertiary butyl alcohol was added at room temperature 6.18 milliliters (4.0 millimoles) of an 0.648 molar solution of hydrogen peroxide in sodium dried tertiary butyl alcohol followed by the dropwise addition of 52 milligrams (0.2 millimole) of osmium tetroxide in eight milliliters of sodium dried tertiary butyl alcohol over a period of eight hours and the resulting mixture held at room temperature for an additional 48 hours. The sodium dried tertiary butyl alcohol used had a moisture content of 0.04 percent.

The reaction mixture was then worked up precisely as in Example 1. There was thus obtained 53 milligrams (seven percent) of starting material, 379 milligrams (47 percent) of hydrocortisone acetate, and 162 milligrams (twenty percent) of the glycol by-product, 11β,17α,20-trihydroxy-21-acetoxy-4-pregnene-3-one.

In the following table there is shown a comparison of the results obtained by the process of the invention (Example 1) as compared with the process of the prior art (Example 2):

TABLE I

|  | Process of Invention | Process of Prior Art | Improvement Obtained by Process of Invention |
|---|---|---|---|
| Recovery of Starting Steroid. | 140 mgs. (20 pct.). | 53 mgs. (7 pct.). | 186 pct. |
| Yield of Desired Product 17-Hydroxy-20-Keto Steroid (hydrocortisone acetate). | 428 mgs. (53 pct.). | 379 mgs. (47 pct.). | 12.7 pct. |
| Yield of By-product (17,20-Dihydroxy Steroid). | 101 mgs. (12.5 pct.). | 162 mgs. (20 pct.) | 37.5 pct. decrease in by-product. |
| Total recovery of starting steroid and desired product and ratio thereof to by-product. | 568 mgs. (5.7:1). | 432 mgs. (2.7:1). | 113 pct. |
| Time | 2 hours | 56 hours | 96 pct. decrease in time. |

From the comparisons given in Table I, it may be seen that the process of the invention gives a marked improvement in all respects, namely, recovery of the starting steroid, yield of the desired product, yield of the undesired by-product, total recovery of starting steroid and desired product and ratio thereof to the undesired by-product and in the time of the reaction.

Further reactions were performed involving variations in the conditions described in Example 1. For example, it was found that under optimum conditions, reaction times as short as five minutes were sufficient for complete reaction. Furthermore, it was found that as little as 0.002 molar equivalents of osmium tetroxide, calculated on the starting steroid, are necessary to obtain optimum yield of desired product. Although the reaction rate was found to drop somewhat at these low concentrations of osmium tetroxide, the rate can readily be raised again by elevation of the reaction temperature. It was also found that the addition of the osmium tetroxide and amine to the steroid prior to the addition of the hydrogen peroxide sometimes resulted in enhanced yield of desired product. Although the reaction proceeds in a manner superior to the processes of the prior art, even in the presence of significant amounts of water, it was found that if the reaction is conducted under as anhydrous conditions as possible, the yield of 17-hydroxy-20-keto product improved.

Variations in the reaction described by Miescher and Schmidlin were made in an attempt to improve the yield reported by them. For example, increasing the amount of hydrogen peroxide from 2.0 to 2.5 molar equivalents decreased the yield. Moreover, adding the osmium tetroxide prior to the hydrogen peroxide did not improve the yield. When the reaction was conducted for only two hours, the yield of hydrocortisone acetate dropped to 7.5 percent. No other variations resulted in an improved yield over that reported by them.

*Example 3.—17α-hydroxy-21-acetoxy-4-pregnene-3,11,20-trione*

Following the procedure in Example 1 and substituting 21-acetoxy-4,17(20)-pregnadiene-3,11-dione for 11β-hydroxy-21-acetoxy-4,17(20)-pregnadiene-3-one as the starting steroid, 17α-hydroxy-21-acetoxy-4-pregnene-3,11,20-trione (cortisone acetate) is produced in substantially the same yield as the hydrocortisone produced in Example 1.

*Example 4.—17α-hydroxy-21-acetoxy-4-pregnene-3,20-dione*

In the same manner as described in Example 1, 17α-hydroxy-21-acetoxy-4-pregnene-3,20-dione (Compound S acetate) is produced using 21-acetoxy-4,17(20)-pregnadiene-3-one as the starting steroid in the reaction described therein.

*Example 5.—11α,17α-dihydroxy-21-acetoxy-4-pregnene-3,20-dione*

11α,17α-dihydroxy-21-acetoxy-4-pregnene-3,20-dione is produced in the reaction described in Example 1 by employing 11α-hydroxy-21-acetoxy-4,17(20)-pregnadiene-3-one as the starting steroid.

Similarly, other acyloxy esters of cortisone, Compound S, and 11α,17α,21-trihydroxy-4-pregnene-3,20-dione are produced by substituting the appropriate 21-acyloxy-4,17(20)-pregnadienones wherein the acyloxy group is formyloxy, propionyloxy, butyryloxy, dimethylacetoxy, valeryloxy, trimethylacetoxy, phenylacetoxy, benzoxy, heptanoyloxy, hexanoyloxy, cyclopentanopropionyloxy, phenylpropionyloxy, or the like, for the 21-acetoxy-4,17(20)-pregnadienones employed as the starting steroid in Examples 1 and 3 to 5.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. A process for the production of a 17α-hydroxy-20-keto-21-acyloxy steroid which comprises: oxygenating a 3-oxygenated-$\Delta^{17(20)}$-21-acyloxy steroid having a pregnane carbon skeleton and wherein the acyl radical is that of an organic carboxylic acid of from one to eight carbon atoms, inclusive, with osmium tetroxide and hydrogen peroxide in the presence of an aromatic tertiary-N-heterocyclic amine.

2. A process of claim 1 in which the amount of osmium tetroxide is less than about 0.2 mole equivalent of the $\Delta^{17(20)}$-21-acyloxy steroid.

3. The process of claim 2 in which the $\Delta^{17(20)}$-21-acyloxy steroid is a pregnane series steroid containing a $\Delta^4$-3-keto group.

4. The process of claim 3 in which between about 2.2 and about 2.75 molar equivalents of hydrogen peroxide are used per mole of starting steroid.

5. The process of claim 4 in which the amount of osmium tetroxide is between 0.05 and about 0.002 mole equivalents.

6. The process according to claim 5 in which the reaction product is treated at room temperature with an aqueous solution of sodium sulfite prior to the removal of the solvent.

7. A process for the production of a 17α-hydroxy-20-keto-21-acyloxy steroid which comprises: preparing a solution of a 3-oxygenated-$\Delta^{17(20)}$-21-acyloxy steroid having a pregnane carbon skeleton and wherein the acyl radical is that of an organic carboxylic acid of from one to eight carbon atoms, inclusive, in a low boiling inert solvent, incorporating osmium tetroxide and an aromatic tertiary-N-heterocyclic amine therein, and then adding to the solution hydrogen peroxide.

8. The process of claim 7 in which the $\Delta^{17(20)}$-21-acyloxy steroid is a 21-acyloxy-4,17(20)-pregnadienone.

9. A process for the production of a 17α-hydroxy-21-acyloxy-4-pregnene-3,20-dione which comprises: mixing a 21-acyloxy-4,17(20)-pregnadiene-3-one represented by the following formula:

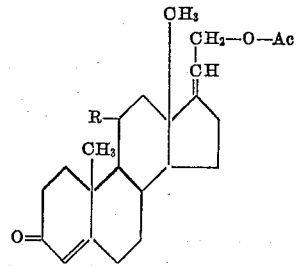

wherein Ac is the acyl radical of an organic carboxylic acid of from one to eight carbon atoms, inclusive, and R is selected from the group consisting of a hydrogen atom, an $\alpha$-acyloxy group, an $\alpha$-hydroxy group, a $\beta$-hydroxy group and a ketonic oxygen atom, with less than about 0.02 molar equivalents of osmium tetroxide and with between about two and about three molar equivalents calculated on the starting steroid, of hydrogen peroxide in pyridine containing tertiary butyl alcohol, to produce a 17$\alpha$-hydroxy-21-acyloxy-4-pregnene-3,20-dione.

10. The process of claim 9 wherein the starting steroid is 11$\beta$-hydroxy-21-acetoxy-4,17(20)-pregnadiene-3-one.

11. The process of claim 9 wherein the starting steroid is 11$\alpha$-hydroxy-21-acetoxy-4,17(20)-pregnadiene-3-one.

12. The process of claim 9 wherein the starting steroid is 21-acetoxy-4,17(20)-pregnadiene-3,11-dione.

13. The process of claim 9 wherein the starting steroid is 21-acetoxy-4,17(20)-pregnadiene-3-one.

References Cited in the file of this patent

UNITED STATES PATENTS 2,493,780   Sarett _____ Jan. 10, 1950